United States Patent
Heintz et al.

[15] 3,700,943
[45] Oct. 24, 1972

[54] DISC-TYPE VARIABLE RELUCTANCE ROTATING MACHINE

[72] Inventors: Walter K. Heintz, Westland; Lewis E. Unnewehr, Birmingham, both of Mich.

[73] Assignee: Ford Motor Company, Dearborn, Mich.

[22] Filed: Nov. 8, 1971

[21] Appl. No.: 196,615

[52] U.S. Cl. ................310/168, 310/112, 310/268
[51] Int. Cl. ...........................................H02k 19/07
[58] Field of Search....................310/168, 117, 268

[56] References Cited

UNITED STATES PATENTS

| | | | |
|---|---|---|---|
| 3,018,396 | 1/1962 | Colgate | 310/268 |
| 3,383,533 | 5/1968 | Jarret et al. | 310/168 |
| 3,401,285 | 9/1968 | French et al. | 310/168 |
| 3,432,706 | 3/1969 | Beyersdorf et al. | 310/268 X |
| 3,435,267 | 3/1969 | Beyersdorf et al. | 310/168 |
| 3,469,134 | 9/1969 | Beyersdorf et al. | 310/268 X |

*Primary Examiner*—D. F. Duggan
*Attorney*—Keith L. Zerschling et al.

[57] ABSTRACT

Described is a novel design for a disc-type variable reluctance rotating machine. The rotating machine, preferably used as a motor, is brushless and in the preferred form comprises a plurality of stator sections supported by a frame. A shaft is rotatably journaled in the frame structure and the stator sections are separated from one another by a plurality of rotor assemblies attached to the shaft for rotation therewith. The stator sections each have a helically wound coil surrounding the shaft and a plurality of inner and outer inserts made from magnetic material. The rotor assemblies also have inserts made from magnetic material to form a flux path around the stator coils. The rotating machine of the invention may be operated as an AC synchronous machine or as a pulsed current variable speed machine.

11 Claims, 4 Drawing Figures

DISC-TYPE VARIABLE RELUCTANCE ROTATING MACHINE

BACKGROUND OF THE INVENTION

This invention relates to disc-type variable reluctance rotating machines. More particularly, the invention relates to a novel construction for a machine of this type.

Disc-type variable reluctance rotating machines are well known in the prior art. The construction and operation of a known design of a reluctance motor, together with various control circuits for such motor, may be seen in U.S. Pat. Nos. 3,560,817 and 3,560,818 issued Feb. 2, 1971, to C. J. Amato, and in U.S. Pat. No. 3,560,820 issued Feb. 2, 1971, in the name of L. E. Unnewehr. Additional control circuits for motors of this type may be seen in U.S. Pat. application Ser. Nos. 121,653 and 121,654 filed in the name of L. E. Unnewehr, 121,655 filed in the name of D. R. Hamburg, and 121,656 filed in the name of W. H. Koch, all of the foregoing U.S. Pat. applications having been filed Mar. 8, 1971, and assigned to the Ford Motor Company.

The motor described in the above-identified references is a three-phase motor design. However, each of the phases is controlled in a similar manner and the principle of operation is identical for all of the phases. The various control circuits for supplying electrical energy to the motor illustrated in the references can also be applied to the variable reluctance rotating machine of the present invention.

SUMMARY OF THE INVENTION

The disc-type variable reluctance rotating machine of the invention is advantageous over prior designs in that it has a relatively simple construction and can be provided with air cooling for its windings and rotor assemblies. Also, the power rating of the machine can be varied merely by changing the length of the rotating shaft and the number of rotor assemblies and stator sections. Furthermore, the machine has a low weight for its power handling capabilities.

The variable reluctance rotating machine of the invention comprises a frame structure having a shaft rotatably journaled therein to permit rotation of the shaft about its axis. At least one stator is provided that includes a support structure having an opening in it through which the shaft passes. The support structure is made from a non-magnetic material and is fixed with respect to the frame structure of the machine.

A helically-wound coil or winding is concentrically positioned around the shaft and within the stator support structure. A plurality of inner stator inserts made from magnetic material and supported by the support structure are positioned in equally-spaced locations on the radially inward side of the coil. A plurality of outer stator inserts, equal in number to the number of inner stator inserts and, similarly, made from a magnetic material, are supported by the support structure. These outer stator inserts are positioned in equally-spaced locations on the radially outward side of the coil and are in radial alignment, respectively, with the inner stator inserts.

At least one rotor assembly is provided for the variable reluctance machine. The rotor assembly is attached to the shaft for rotation therewith in a position axially adjacent to, and on one side of, the stator. The rotor assembly includes a rotor disc made from a non-magnetic material and a plurality of rotor inserts made from a magnetic material. The rotor inserts are positioned in equally-spaced locations in the rotor disc to permit them alternately to come into and to go out of axial alignment with the inner and outer stator inserts when the shaft and rotor assembly is rotated.

Preferably, the machine of the invention includes a plurality of stators and a plurality of rotor assemblies, the rotor assemblies exceeding by one the number of stators. The stators are positioned in spaced locations along the axis of the machine. The rotor assemblies are positioned between and adjacent to the various stators.

Where the machine is provided with a plurality of rotor assemblies and stators, it may be used in multi-phase operation. This may be accomplished by the axial misalignment of the inner and outer stator inserts in one of the stators with respect to such inserts in another of the stators.

Reference has been made, and will be made hereinafter, to inner and outer stator inserts and to rotor inserts made from a "magnetic material." The term "magnetic material" as used herein refers to a material having a permeability substantially greater than the permeability of free space.

DETAILED DESCRIPTION OF THE INVENTION

Figure 1:
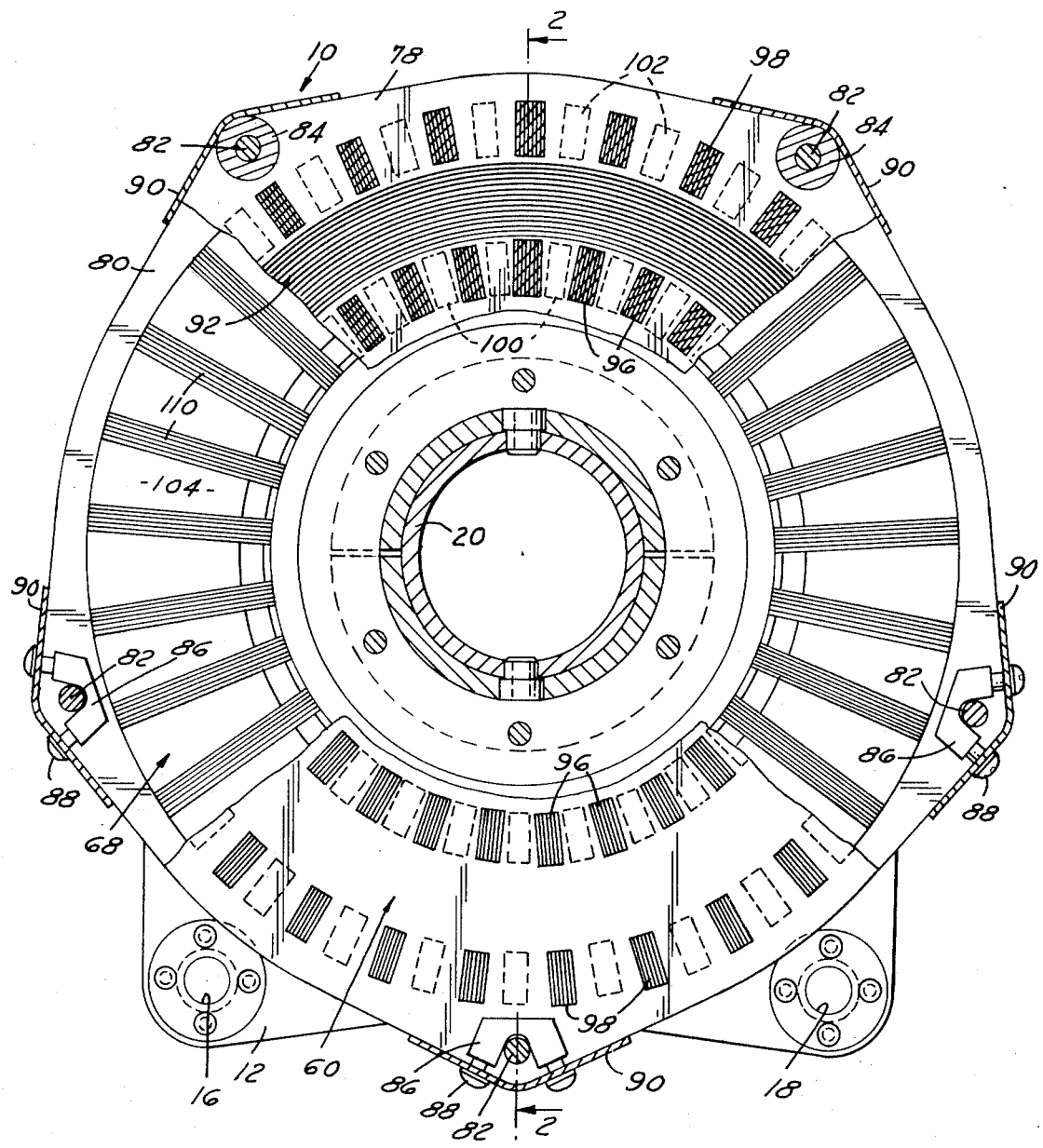
FIG. 1 is a sectional elevational view, with parts broken away, of a variable reluctance rotating machine constructed in accordance with the invention.
Figure 2:
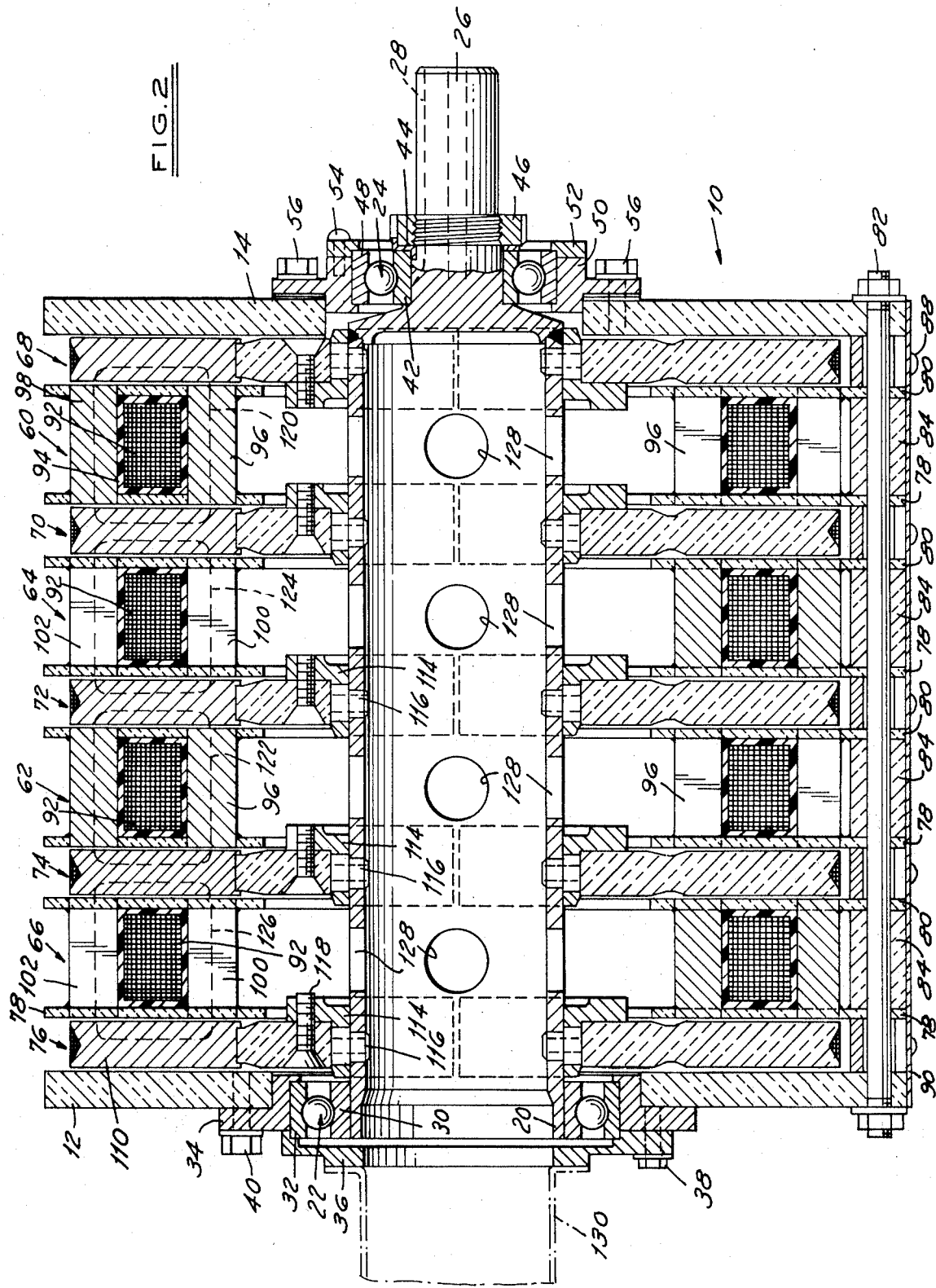
FIG. 2 is a sectional view of the variable reluctance machine of FIG. 1 taken along the line 2—2 of FIG. 1.

The sectional views of FIGS. 1 and 2 illustrate a two-phase variable reluctance rotating machine constructed in accordance with the invention. The machine is generally designated by the numeral 10.

The variable reluctance machine 10 includes a frame structure formed by end plates 12 and 14. End plates 12 and 14 are made from a non-magnetic material, such as non-magnetic stainless steel or fabric-reinforced phenolic. As may best be seen in FIG. 1, the end plates 12 and 14 may have extending portions including reinforced openings 16 and 18 which may serve as machine supports.

A hollow shaft 20 is journaled at 22 and 24 in the end plates 12 and 14, respectively. The hollow shaft 20 has a solid end portion 26, which may be provided with a keyway 28, used as the output shaft of the machine. The shaft 20 is journaled for rotation about its own axis by means of ball bearings attached to the end plates 12 and 14. The bearing for the end plate 12 includes an inner race 30 positioned on the left end of the shaft 20 and an outer race 32 held in place with respect to the end plate 12 by a bearing adapter ring 34 and a bearing cap 36. The bearing cap 36 is affixed to the bearing adapter ring with screws 38, and the bearing adapter ring 34 is attached to the end plate 12 with screws 40.

The bearing for the end plate 14 has an inner race 42 held in place on the extended portion 26 of the shaft 20 by means of a retainer ring 44 and nut 46 threaded on the shaft extension 26. An outer race 48 is affixed to the end plate 14 with a bearing retainer 50 and a bearing cap 52. The bearing cap 52 is attached to the bearing retainer 50 with screws 54, and the bearing retainer 50 is attached to the end plate 14 with screws 56.

The variable reluctance machine includes four stators 60, 62, 64, and 66 that are equally spaced from one another and from the end plates 12 and 14. Positioned in the spaces formed between the stators and the end plates 12 and 14 are five identical rotor assemblies, 68, 70, 72, 74, and 76. Stators 60 and 62 are identical to one another and form portions of the first phase of the machine. Stators 64 and 66 are identical to one another and form portions of the second phase of the machine. Stators 64 and 66 of the second phase differ only slightly from stators 60 and 62 of the first phase. This difference is described hereinafter.

Each of these stators includes a pair of side plates 78 and 80. These form support structures for the stators and are fixed to the end plates 12 and 14 by tie rods 82. Spacers 84 are placed between the pairs of side plates 78 and 80 and around the tie rod 82. Further structural support is provided by spacer locks 86 that surround the tie rod 82 and are held by screws 88 to clamp plates 90.

Because stators 60 and 62 are identical, only stator 60 is described in detail. Stator 60 includes a helically-wound coil 92 surrounded by a suitable electrical insulation material 94 and positioned between stator side plates 78 and 80. Positioned on the radially inward side of the coil 92 are a plurality of inner stator inserts 96 made from a magnetic material. Preferably, the magnetic material comprises laminated pieces of high permeability ferromagnetic material with the laminations extending in the axial direction. Positioned on the radially outward side of the coil 92 are a plurality of outer stator inserts 98 made from a magnetic material, also, preferably, a ferromagnetic material with the laminations running in the axial direction. The inner stator inserts 96 and outer stator inserts 98 span the distance between the spaced stator side plates 78 and 80. In the machine design shown in FIGS. 1 and 2, there are twenty-nine inner stator inserts 96 and a corresponding number of outer stator inserts 98. The inner stator inserts 96 are in radial alignment with the outer stator inserts 98. The number of such inner and outer inserts may be varied in accordance with machine design requirements.

The stators 64 and 66 are identical to the above-described stators 60 and 62, except for the positioning of the inner and outer stator inserts. In FIGS. 1 and 2, the inner stator inserts for stators 64 and 66 are designated by the numeral 100, whereas stator inserts for these stators are designated by the numeral 102. In FIG. 1, the inner and outer stator inserts for stator 64 are shown in broken lines. It may be seen that these inserts 100 and 102 are in fixed positions that are axially in line, respectively, with the spaces between the inner stator inserts 96 and outer stator inserts 98 of the stator 60.

Figure 4:
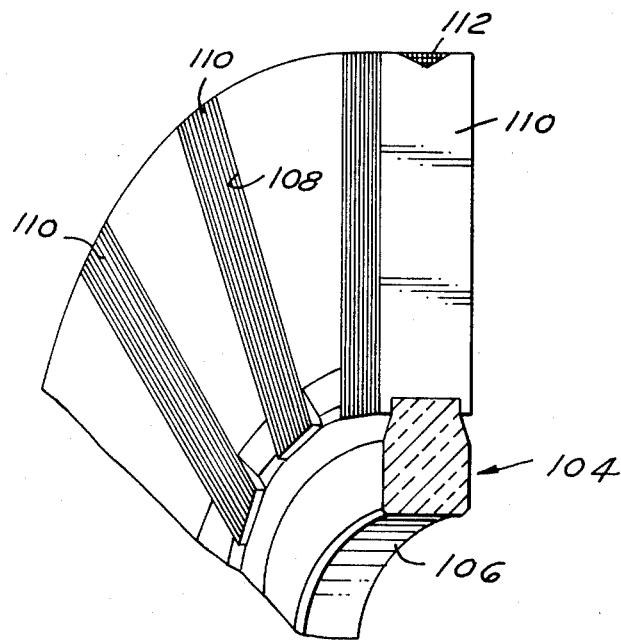
FIG. 4 is a pictorial view of a rotor assembly for such machine.
Figure 3:
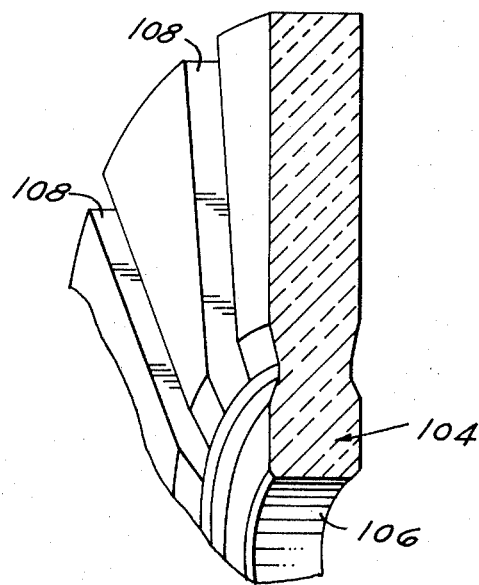
FIG. 3 is a pictorial view of a rotor disc for the variable reluctance machine of FIGS. 1 and 2.

The construction of the rotor assemblies 68, 70, 72, 74 and 76 will now be described in connection with FIGS. 3 and 4. In FIG. 3, there is shown a rotor disc 104 made from a non-magnetic material, such as fabric-reinforced phenolic. The rotor disc 104 has a central opening 106 through which the shaft 20 of the variable reluctance machine may pass. The rotor disc 104 also has a plurality of slots 108 extending in a generally radial direction. In the embodiment illustrated in the drawings, there are 29 of these slots in each of the rotor discs. This corresponds to the number of inner stator inserts and to the number of outer stator inserts. The slots are equally spaced from one another around the rotor disc. With reference now to FIG. 4, there is shown a partial pictorial view of the rotor assembly. The assembly includes the rotor disc 108 and a plurality of rotor inserts made from a magnetic material, preferably, a laminated ferromagnetic material with the laminations extending in a generally radial direction as illustrated. The rotor inserts 110 are located in the rotor slots 108. Preferably, a V-shaped groove 112 is cut into the circumference of the rotor assembly. The groove 112 is then wrapped with a continuous filament of a material such as fiberglass and coated with an epoxy resin to provide a circumferential restriction on the rotor assembly.

With reference once again to FIGS. 1 and 2, the manner in which the rotor assemblies are attached to the machine shaft 20 may be seen. The rotor assemblies 68, 70, 72, 74, and 76 are identical, are positioned with their rotor inserts 110 in axial alignment with one another, and are attached to the shaft 20 in a similar manner. With particular reference to rotor assembly 76, a rotor adapter ring 114, which may be a split ring as shown by the broken lines in FIGS. 1 and 2, is attached to the shaft 20 by means of locating pins 116. The rotor assembly 76 is then positioned around the shaft 20 and rotor adapter ring 114 and held in place with screws 118. In FIGS. 1 and 2, the rotor inserts 110 of the five rotor assemblies are depicted as being axially in line with the inner and outer stator inserts of stators 60 and 62 and axially in line with the spaces between the inner and outer stator inserts of stators 64 and 66. When current flows in the coils 92 of the stators 60, 62, 64 and 66, magnetic flux is produced having the paths indicated by the broken lines 120, 122, 124, and 126. Each of these flux paths includes an inner stator insert, a rotor insert, an outer stator insert, another rotor insert, and four air gaps formed between the rotor inserts and the inner and outer stator inserts.

The operation of the variable reluctance rotating machine depicted in the drawings will now be described in connection with pulsed DC two-phase operation of the machine as a motor. With the rotor assemblies 68, 70, 72, 74, and 76 positioned as shown in the drawings, the magnetic circuits for the stators 60 and 62 have a minimum reluctance and the magnetic circuits for the stators 64 and 66 have a maximum reluctance. If current is made to flow at this time through coils 92 of stators 64 and 66, a torque is produced tending to draw the rotor inserts 110 of rotor assemblies 70, 72, 74, and 76 toward the inner and outer stator inserts 100 and 102 of stators 64 and 66 to place them in axial alignment with the rotor inserts 110, thereby, to minimize the reluctance of the magnetic circuits for the coils 92 of the stators. This torque is the result of the tendency of a magnetic circuit to produce a force to minimize the reluctance of the magnetic circuit. This torque may also be thought of as the result of the attractive force between a north pole and a south pole.

If, after the rotor inserts 110 of rotor assemblies 70, 72, 74, and 76 have become axially aligned with inner stator inserts 100 and outer stator inserts 102 of stators 64 and 66, the current to the coils 92 of these stators ceases, and current is then supplied to the coils 92 of stators 60 and 62, then the rotor assemblies 68, 70, 72, and 74 will experience a torque tending to draw their rotor inserts 110 into axial alignment with the inner and outer stator inserts of stators 60 and 62. Thus, a current is alternately supplied to the coils 92 of stators 60 and 62 and to the coils 92 of stators 64 and 66 to produce a torque tending to rotate the shaft 20 of the motor. Various control circuits and logic circuitry can be used to control the application of current to the motor coils. Circuits and apparatus which can be used for this purpose are disclosed in detail in the previously cited patents and patent applications.

The variable reluctance rotating machine of the invention can also be operated as an AC synchronous machine if means are provided for bringing the shaft and rotor assemblies up to synchronous speed. This is necessary because the machine of the invention lacks starting torque when operated with AC.

A functional variable reluctance rotating machine constructed in accordance with the invention need only include one stator and one rotor assembly, but, preferably, two rotor assemblies would be used with the two rotor assemblies being positioned adjacent to and on opposite sides of the stator. Also, multi-phase construction of the rotating machine is unnecessary. A machine constructed with only one stator necessarily would be a single-phase machine, although a single-phase machine may include more than one stator. Furthermore, the power rating of the machine can be varied by changing the length of the shaft 20 and the number of stators and rotor assemblies.

It should be noted once again that the shaft 20 of the motor is hollow and has a plurality of spaced openings 128 in it. This is a desirable feature of the variable reluctance rotating machine construction in that it permits the addition to the machine of means for supplying forced air to it for purposes of cooling the coils 92, other stator parts, and the rotor assemblies. The air passes through the hollow shaft and out the openings 128 therein, flows radially outward through the stator and rotor assemblies and exits from the machine. Conduit means 130 and a fan or the like (not shown) may be provided for supplying air to the variable reluctance rotating machine. In intermittent or low power motor applications where air cooling is unnecessary, the shaft 20 may be solid and the support structures for the stators of the machine can be of a solid construction rather than being formed by a pair of side plates 78 and 80 as illustrated in the drawings.

Based upon the foregoing description of the invention, what is claimed and desired to be protected by Letters Patent is:

1. A variable reluctance rotating machine, which comprises:

a. a frame structure;
   b. a shaft rotatably journaled in said frame structure to permit rotation of said shaft about its axis;
   c. a stator, said stator comprising a support structure having an opening therein through which said shaft passes, said support structure being made from a non-magnetic material and being fixed with respect to said frame structure; a helically-wound coil concentrically positioned around said shaft and within said support structure; a plurality of inner stator inserts made from magnetic material and supported by said support structure, said inner stator inserts being positioned in equally-spaced locations on the radially inward side of said coil; and a plurality of outer stator inserts, equal in number to the number of said inner stator inserts, said outer stator inserts being made from a magnetic material and being supported by said support structure, said outer stator inserts being positioned in equally-spaced locations on the radially outward side of said coil and in radial alignment, respectively, with said inner stator inserts; and
   d. a rotor assembly attached to said shaft for rotation therewith in a position axially adjacent to, and on one side of, said stator, said rotor assembly comprising a rotor disc made from a non-magnetic material and a plurality of rotor inserts made from a magnetic material, said rotor inserts being positioned in equally-spaced locations in said rotor disc to permit them alternately to come into and to go out of axial alignment with said inner and outer stator inserts when said shaft and rotor assembly are rotated.

2. A variable reluctance rotating machine in accordance with claim 1, which further comprises a second rotor assembly having a structure as defined in (d) of claim 1, said second rotor assembly being attached to said shaft for rotation therewith in a position axially adjacent to, and on the other side of, said stator.

3. A variable reluctance rotating machine in accordance with claim 1, wherein said support structure of said stator includes a pair of side plates axially spaced from one another, said inner and outer stator inserts extending between said side plates.

4. A variable reluctance rotating machine in accordance with claim 2, wherein said support structure of said stator includes a pair of side plates axially spaced from one another, said inner and outer stator inserts extending between said side plates.

5. A variable reluctance rotating machine, which comprises:

a. a frame structure;
   b. a shaft rotatably journaled in said frame structure to permit rotation of said shaft about its axis;
   c. a plurality of stators, each of said stators comprising a support structure having an opening therein through which said shaft passes, said support structure being made from a non-magnetic material and being fixed with respect to said frame structure; a helically-wound coil concentrically positioned around said shaft and within said support structure; a plurality of inner stator inserts made from magnetic material and supported by said support structure, said inner stator inserts being positioned in equally-spaced locations on the radially inward side of said coil; and a plurality of outer stator inserts, equal in number to the number of said inner stator inserts, said outer stator inserts being made from a magnetic material and being supported by said support structure, said outer stator inserts being positioned in equally-spaced locations on the radially outward side of said coil and in radial alignment, respectively, with said inner stator inserts; and d. a plurality of rotor assemblies attached to said shaft for rotation therewith, the number of said rotor assemblies exceeding by one the number of said stators, said rotor assemblies being attached to said shaft at axially spaced locations, thereby, to form a number of spaces equal to the number of said stators, said stators being positioned in said spaces, each of said rotor assemblies comprising a rotor disc made from a non-magnetic material and a plurality of rotor inserts made from a magnetic material, said rotor inserts being positioned in equally-spaced locations in said rotor disc to permit them alternately to come into and to go out of axial alignment with said inner and outer stator inserts when said shaft and rotor assembly are rotated.

6. A variable reluctance rotating machine in accordance with claim 5, wherein said inner and outer stator inserts of at least one of said stators are axially misaligned with said inner and outer stator inserts of another of said stators.

7. A variable reluctance rotating machine in accordance with claim 6, wherein said inner and outer stator inserts of adjacent stators are axially misaligned with one another.

8. A variable reluctance rotating machine, which comprises: a frame structure; a shaft rotatably journaled in said frame structure to permit rotation of said shaft about its axis; a plurality of rotor assemblies attached to said shaft for rotation therewith and axially spaced from one another on said shaft, each of said rotor assemblies comprising a rotor disc made from a non-magnetic material and a plurality of rotor inserts made from a magnetic material, said rotor inserts being positioned in equally-spaced locations in said rotor disc; and a plurality of stators fixed with respect to said frame, one stator being positioned in each of the spaces formed between said axially spaced rotor assemblies, each of said stators including a support structure having an opening therein through which said shaft passes, said support structure being made from a non-magnetic material, a helically-wound coil concentrically positioned around said shaft and within said support structure, a plurality of inner stator inserts made from magnetic material and supported by said support structure, said inner stator inserts being positioned in equally-spaced locations on the radially inward side of said coil, and a plurality of outer stator inserts, equal in number to the number of said inner stator inserts, said outer stator inserts being made from a magnetic material and being supported by said support structure, said outer stator inserts being positioned in equally-spaced locations on the radially outward side of said coil and in radial alignment, respectively, with said inner stator inserts.

9. A variable reluctance rotating machine in accordance with claim 8, wherein said support structure of each of said stators comprises a pair of side plates, said inner and outer stator inserts extending between said side plates.

10. A variable reluctance rotating machine, which comprises a frame structure; a shaft rotatably journaled in said frame structure to permit rotation of said shaft about its axis; a plurality of stators attached to said frame structure, each of said stators including a helically-wound coil surrounding said shaft and a plurality of inner and outer stator inserts, said inner stator inserts being separated from said outer stator inserts by said coil; and a plurality of rotor assemblies attached to said shaft, the number of said rotor assemblies exceeding by one the number of said stators, and said rotor assemblies being separated from one another in the axial direction of said shaft by said stators, each of said rotor assemblies including a rotor disc made from a non-magnetic material and a plurality of rotor inserts made from a magnetic material, said rotor inserts extending in a radial direction from said inner stator inserts to said outer stator inserts.

11. A variable reluctance rotating machine, which comprises: a pair of end plates parallel to and spaced from one another to form a frame structure; a hollow shaft positioned between said end plates, said hollow shaft having a plurality of spaced openings therein to permit flow of air therethrough, said shaft being journaled in said end plates for rotation with respect to said end plates; a plurality of stators equally spaced from said end plates and from one another to form spaces numbering one in excess of the number of said stators, each of said stators including a support structure formed by a pair of side plates having central openings therein through which said shaft passes, said side plates being spaced from one another, a helically-wound coil concentrically positioned around said shaft and between said pair of side plates, a plurality of inner stator inserts made from magnetic material and extending between said pair of side plates on the radially inward side of said coil, a plurality of outer stator inserts made from magnetic material and extending between said side plates on the radially outward side of said coil, said outer stator inserts being equal in number to said inner stator inserts and being in radial alignment therewith, respectively; a plurality of rotor assemblies numbering one in excess of the number of said stators, said rotor assemblies being positioned, respectively, in said spaces between said stators and said end plates, each of said rotor assemblies comprising a rotor disc made from a non-magnetic material, said rotor disc having a plurality of slots therein extending in a generally radial direction, the number of said slots corresponding to the number of said inner stator inserts, and a plurality of rotor inserts made from magnetic material, one of said rotor inserts being positioned in each of said rotor slots; means for attaching said rotor assemblies to said shaft, said means including a rotor adapter ring for each of said rotor assemblies, said rotor adapter ring being affixed to said rotor discs and to said shaft; tie rod means for positioning said stators relative to said end plates in fixed relation thereto; and spacers for maintaining the position of said stators and rotor assemblies relative to one another, said spacers being positioned between said stator side plates.

* * * * *